United States Patent
Sonner et al.

(10) Patent No.: US 10,773,339 B2
(45) Date of Patent: Sep. 15, 2020

(54) SCANNING HEAD WITH INTEGRATED BEAM POSITION SENSOR AND ADJUSTMENT ARRANGEMENT FOR AN OFF-LINE ADJUSTMENT

(71) Applicant: SCANLAB GMBH, Puchheim (DE)

(72) Inventors: Christian Sonner, Puchheim (DE); Matthias Rabe, Puchheim (DE)

(73) Assignee: Scantab GmbH, Puchheim (DE)

( * ) Notice: Subject to any disclaimer, the term of this patent is extended or adjusted under 35 U.S.C. 154(b) by 319 days.

(21) Appl. No.: 15/736,905

(22) PCT Filed: Jun. 3, 2016

(86) PCT No.: PCT/EP2016/062577
§ 371 (c)(1),
(2) Date: Dec. 15, 2017

(87) PCT Pub. No.: WO2016/206943
PCT Pub. Date: Dec. 29, 2016

(65) Prior Publication Data
US 2018/0169788 A1 Jun. 21, 2018

(30) Foreign Application Priority Data

Jun. 22, 2015 (DE) .................... 10 2015 109 984

(51) Int. Cl.
*B23K 26/082* (2014.01)
*B23K 26/03* (2006.01)
(Continued)

(52) U.S. Cl.
CPC .......... *B23K 26/082* (2015.10); *B23K 26/032* (2013.01); *B23K 26/043* (2013.01);
(Continued)

(58) Field of Classification Search
CPC .. B23K 26/082; B23K 26/032; B23K 26/043; B23K 26/0643; B23K 26/0648; B23K 26/0665
(Continued)

(56) References Cited

U.S. PATENT DOCUMENTS 6,548,796 B1 * 4/2003 Silvermintz ....... G02B 21/0024
250/201.3
2003/0222143 A1 12/2003 Mitchell
(Continued)

FOREIGN PATENT DOCUMENTS

DE 29 612 073 U1 11/1997
DE 103 35 501 A1 2/2004
(Continued)

OTHER PUBLICATIONS

German Search Report, dated Feb. 24, 2016.
(Continued)

*Primary Examiner* — Tuan N Nguyen
(74) *Attorney, Agent, or Firm* — Dority & Manning, P.A.

(57) ABSTRACT

A scanner head for laser material processing with a laser beam includes focusing optics, and a beam position system that influences a position of the laser beam and is upstream of the focusing optics in a direction of propagation of the laser beam. The beam position system includes at least two controllable movable optical elements by means of which an angle of incidence of the laser beam on a processing surface of a workpiece is adjustable. A processing location of the laser beam on the processing surface is also movable in two dimensions. A beam position sensor is downstream of the beam position system and is configured to detect an actual position of the laser beam or at least four independent position parameters of the laser beam.

14 Claims, 4 Drawing Sheets

(51) Int. Cl.
*B23K 26/06* (2014.01)
*B23K 26/04* (2014.01)

(52) U.S. Cl.
CPC ...... *B23K 26/0643* (2013.01); *B23K 26/0648* (2013.01); *B23K 26/0665* (2013.01)

(58) Field of Classification Search
USPC .................................................. 219/121.74
See application file for complete search history.

(56) References Cited

U.S. PATENT DOCUMENTS

| | | | |
|---|---|---|---|
| 2006/0160332 A1* | 7/2006 | Gu | B23K 26/082 |
| | | | 438/463 |
| 2009/0007933 A1* | 1/2009 | Thomas | B23K 26/032 |
| | | | 219/121.6 |
| 2015/0343561 A1* | 12/2015 | Miller | B23K 26/032 |
| | | | 219/121.81 |

FOREIGN PATENT DOCUMENTS

| | | |
|---|---|---|
| DE | 10 2004 053 298 A1 | 3/2006 |
| DE | 10 2006 047 277 A1 | 4/2008 |
| DE | 10 2010 005 896 A1 | 10/2010 |
| DE | 10 2012 111 090 A1 | 3/2014 |
| DE | 10 2013 222 834 A1 | 5/2015 |
| JP | H 10 137962 A | 5/1998 |
| JP | 2005-118815 A | 5/2005 |

OTHER PUBLICATIONS

PCT Search Report, dated Sep. 12, 2016.
PCT International Preliminary Report on Patentability, dated Jan. 4, 2018.
JPO Examination Report, dated Jul. 21, 2020.

* cited by examiner

SCANNING HEAD WITH INTEGRATED BEAM POSITION SENSOR AND ADJUSTMENT ARRANGEMENT FOR AN OFF-LINE ADJUSTMENT

FIELD OF THE INVENTION

The present invention relates to a scanner head for laser material processing with focusing optics and a beam position system for influencing the laser beam position, which is upstream of the focusing optics in the direction of propagation of the laser beam, which comprises at least two controllable movable optical elements and by means of which an angle of incidence of the laser beam on the processing surface is dynamically adjustable, and the processing location of the laser beam is dynamically movable on the processing surface in two dimensions. Furthermore, the invention relates to an adjustment device with such a scanner head along with an adjustment process for offline adjustment.

BACKGROUND

The above-mentioned scanner heads are used for various purposes, in particular for marking, labeling, for abrasive and/or structuring processing, for cutting, for drilling, for sintering, or for welding. For various applications of laser material processing, it is advantageous not only to guide the position of the laser focus on an arbitrary path, but at the same time to control the angle of incidence of the laser beam axis on the workpiece. As a result, structures of any shape (for example) can be introduced into a workpiece, the edges of which feature a desired angle of inclination to the workpiece surface. Ideally, the angle of incidence should be adjustable independently of the path guidance. The independent adjustment of both parameters should be feasible with high precision and high speed, in order to achieve correspondingly high processing speeds in laser material processing.

A corresponding device and a method for guiding a laser beam is known from DE 10 2013 222 834 A1. The device for guiding the laser beam for machining a workpiece features a mirror device with movable mirrors for generating an angle of attack of the laser beam on focusing optics for adjusting a lateral offset of the laser beam on the workpiece and for generating a lateral offset of the laser beam on the focusing optics for adjusting an angle of incidence of the laser beam on the workpiece. Along the propagation of a laser beam, a first beam splitter is arranged between a laser source and the mirror device. A first sensor element is allocated to the first beam splitter. Such first sensor element serves to monitor the beam profile and the beam position. Thereby, the beam position can be detected exclusively in an area upstream of the mirror device. The disadvantage here is that an adjustment of the system can take place exclusively through components that are upstream of the mirror assembly in the direction of propagation of the laser beam. Usually, these are components are not parts of the scanner head. Such an adjustment is highly complex, protracted, and expensive.

Furthermore, DE 10 2004 053 298 A1 discloses a scan head as part of a laser, drilling and cutting device. This features a series of the following components arranged in the light path of the laser: an intensity-regulating beam damping unit in conjunction with a wobble unit regulating a parallel beam displacement, a beam expander telescope increasing the beam cross section of the laser, a scan block guiding the focus of the laser beam, and a working unit focusing the laser beam on the specimen along with additional testing and control units that optionally can be coupled in the light path. The beam damping unit contains a sequence, arranged in the light path, of a retarder, a first Brewster window and a second Brewster window, whereas the retarder and/or at least one of the two Brewster windows are designed to be rotatable around the optical axis. The wobble unit is formed from arrangement of two plane-parallel windows introduced into the light path, whereas the axis of rotation of the first plane-parallel window, the axis of rotation of the second plane-parallel window, and the direction of propagation of the laser beam are orthogonal to each other. The retarder or the plane-parallel window are expediently moved by galvanometer units.

SUMMARY OF THE INVENTION

Thus, it is a task of the present invention to provide a scanner head, an adjustment device, and an adjustment process by means of which, on an offline basis (that is, prior to the actual machining process), the adjustment of the system can take place with a high degree of efficiency and/or precision, without this having to influence components upstream to the scanner head in the direction of propagation of the laser beam. Additional objects and advantages of the invention will be set forth in part in the following description, or may be obvious from the description, or may be learned through practice of the invention.

The tasks are solved by a scanner head, an adjustment device, and an adjustment process with the characteristics as described and claimed herein.

A scanner head for laser material processing with focusing optics and a beam position system is proposed. By means of the focusing optics, a laser beam can be focused in a processing location, in particular on a processing surface of a workpiece or in the vicinity of such processing location. With the beam positioning system, the laser beam position on the processing surface of the workpiece can be influenced. The laser beam position is defined by four, in particular independent, geometric parameters. These include, for example, an x-coordinate and a y-coordinate for defining a passage point through a plane and a direction of propagation in space defined (for example) by a first and/or second solid angle. The beam position system is upstream of the focusing optics in the direction of propagation of the laser beam. Furthermore, the beam position system comprises at least two movable optical elements that can be controlled, in particular by means of a control unit. The beam position system is formed in such a manner that, by means of it, the angle of incidence of the laser beam on the processing surface is adjustable. This can take place, for example, through a parallel displacement of the laser beam perpendicular to the optical axis of the focusing optics. Furthermore, the beam position system is formed in such a manner that, by means of it, the processing location of the laser beam can be moved on the processing surface in two dimensions, in particular in an x-y plane. This can take place, for example, through a deflection (angulation) of the laser beam relative to the optical axis of the focusing optics.

The scanner head includes a beam position sensor. The beam position sensor is downstream of the beam position system in the direction of propagation of the laser beam. Furthermore, the beam position sensor is formed in such a manner that, by means of it, in particular for the offline adjustment of the beam position system, at least four independent, in particular at least one rotational and/or translational, position parameters of the laser beam can be detected. In addition or alternatively, the beam position sensor is formed in such a manner that, by means of it, in particular indirectly and/or directly, the actual position of the laser beam can be detected. The actual position is determined by the at least four independent position parameters. The beam position sensor is preferably arranged and/or configured in such a manner that, by means of it, the at least four independent position parameters and/or the actual position of the laser beam, determined in particular by them, can be detected in the housing interior of the scanner head and/or in an area downstream of the beam position system. The actual position is accordingly detected, in particular indirectly, on the basis of the at least four independent position parameters.

The sensory detection takes place by means of the beam position sensor, in particular in relation to the direction of propagation of the laser beam and/or in relation to its beam path in the area between the beam position system and the focusing optics. Given that the actual position of the laser beam is detected only in an area downstream of the beam position system, a correction of an externally induced error, which is caused in particular by a component upstream of the scanner head, can advantageously be undertaken by the beam position system itself. Thus, it is not necessary to influence the external component. Rather, the external error is compensated by the scanner head itself. Furthermore, with the scanner head described above, an offline adjustment of the system can be carried out very rapidly and inexpensively by means of a corresponding readjustment of the beam position system. Furthermore, such an offline adjustment by means of the beam position system is characterized by a very high degree of accuracy.

It is advantageous if the beam position sensor is formed in such a manner that such translational position parameter, that is 2D locations in particular, and/or rotational position parameter, that is a 2D position angle, can be detected. With this, the translational position parameters are detected in particular in an x-y plane, as the x-coordinate and/or as the y-coordinate, and reproduce the theoretical penetration point of the laser beam through the x-y plane. Thus, the x-y plane in which the position parameters are detected is advantageously aligned with the beam path in an oblique, in particular perpendicular, manner. In addition or alternatively, it is also advantageous if the beam position sensor can detect a first inclination angle in an x-z plane and/or a second inclination angle of the laser beam in a y-z plane. For this purpose, it is advantageous if the beam position sensor comprises at least two sensors, in particular 2D sensors. For example, two translational position parameters can be determined in two planes, by means of two 2D sensors, which are arranged in the beam path in relation to the course of the laser beam in the beam direction. Based on the two penetration points of the respective sensor plane and the known distance between the two sensor planes, the exact actual position of the laser beam can now be determined or detected. For the determination of a rotational position parameter, for example, a sensor lens can be arranged in front of a 2D sensor of the beam position sensor, which sensor lens causes a defined deflection of the laser beam as a function of the angle of incidence, and/or thus makes it possible to measure a rotational position parameter with a position-sensitive sensor.

The beam position sensor may also comprise a multiple number, in particular two, three or four sensor units, which are designed for the purpose of determining one or more position parameters at different locations in the beam path, whereas four independent position parameters can be determined from the combination of such measurement results. Such sensor units can also be formed in a manner that is structurally separated. For example, four slot diodes may be used to detect, for example, a total of four 1D items of information regarding beam position at multiple locations in an area of the beam path, which may be offset together with the known geometry of the sensor assembly and the distances to a measured beam position.

Furthermore, quadrant diodes, camera elements, so-called "PSDs" ("position-sensitive devices") or wavefront sensors are possible sensors with which geometrical information regarding the beam position, such as location or direction of propagation, can be determined, and from which a beam position sensor can thus be constructed.

The beam position sensor can be permanently integrated into the scanner head. Alternatively, however, this can also be installed in such a manner that it can be removed from the scanner head and/or can be detachably connected to it only for the purpose of adjusting the scanner head.

In order to detect the laser beam through a sensor, this is decoupled in an area downstream of the beam position system. The position of the beam after decoupling is in a defined and fixed relationship to the position of the beam at the point of decoupling, such that the measured position inside the sensor clearly represents the position at the point of decoupling. For this purpose, a beam splitter, in particular a semi-transparent mirror, is advantageously upstream of the beam position sensor in the direction of propagation of the laser beam. The beam splitter can be pivoted in and out of the beam path. Accordingly, it is conceivable that the beam splitter is pivoted in for adjustment prior to the actual machining process (that is, offline) and is once again pivoted out during the actual machining process (that is, online).

It is advantageous if the beam position sensor is able to detect through a sensor the actual position of the laser beam in the area between the beam position system and the focusing optics. For this purpose, it is advantageous if the beam splitter is arranged in the beam path in the area between the beam position system and the focusing optics.

In order to be able to decouple the laser beam from the processing beam path for sensory detection, it is advantageous if the beam position sensor and the beam splitter are arranged relative to one another in such a manner that the laser light transmitted by the beam splitter can be guided onto the beam position sensor and/or that the laser light reflected by the beam splitter can be guided onto the focusing optics.

In order to analyze the data detected through a sensor, it is advantageous if the scanner head comprises an integrated computing unit. Here, the computing unit is arranged in the housing interior of the scanner head. Preferably, an integrated computing unit of the beam position sensor and/or a control unit of the beam position system, which is preferably also integrated into the scanner head, is connected to it. This preferably comprises a cable-based linkage of the aforementioned components.

Alternatively, it is also advantageous if the scanner head comprises an external interface, through which an external computing unit can be connected or is connected to the beam position sensor and/or the control unit. Thereby, the manufacturing costs of the scanner head can be reduced, since only one processing unit would be necessary for multiple scanner heads, which processing unit can be connected through the corresponding external interface to the beam position sensor and/or the control unit.

It is advantageous if the scanner head comprises an adjustment device for the offline adjustment of the laser beam, or is at least formed as part of such an adjustment device. The adjustment device advantageously comprises the beam position sensor for detecting the actual position, the computing unit for determining a correction value, the control unit for setting the correction value and/or the beam position system for setting the new laser beam position dependent on the correction value. If the scanner head features an internal computing unit, the adjustment device is thus completely integrated into the scanner head. With an external computing unit, the scanner head forms a part of the adjustment device. Thus, by means of the adjustment device, advantageously, upon the installation of the scanner head or, however, in order to eliminate drift errors (for example, those caused by temperature), there can be an adjustment prior to each machining process or at predetermined time intervals, without having to have influence on external components upstream in the beam path of the laser beam, such as the laser beam source.

It is advantageous if the scanner head or the external computing unit (if applicable) features a memory unit in which the target position of the laser beam is stored. The memory unit may be a separate component that is connected to the computing unit or that can also be integrated directly into the computing unit. The target position may also be indirectly stored by the at least four independent target position parameters. The target position of the laser beam is preferably determined at the factory, in particular individually for the respective scanner head, and stored in the memory unit of the scanner head.

It is advantageous if the computing unit is formed in such a manner that, by means of it, at least one correction value for the beam position system can be calculated by means of an actual/target position comparison. For this purpose, it is advantageous if the computing unit has used or implemented an iterative approximation process or a stochastic search process. The correction value is preferably formed to be multidimensional. This means that the correction value reflects the delta between the target position and the actual position in several adjustment dimensions of the beam position system. The correction value accordingly comprises at least one readjustment value for at least two optical elements of the beam position system. Furthermore, it is advantageous if the computing unit automatically transmits the correction value to the control unit.

It is advantageous if the scanner head is formed in such a manner that the machining process, in particular solely, can be carried out when the beam position sensor is deactivated. Thus, the material machining process can proceed without the beam position sensor being activated.

The computing unit and the control unit can be formed as separate components. Alternatively, however, it is also just as advantageous if the computing unit and the control unit are configured together as a computing/control unit integrated into the scanner head.

In an advantageous additional form of the invention, the beam positioning system comprises at least four rotatable mirrors. Each of such rotatable mirrors is preferably formed to be rotatable only around a single respective axis of rotation. The axes of rotation of the mirrors are at least partially different from each other; that is, they are oriented differently from each other in space. They can be controlled advantageously by means of the control unit. If each of the mirrors is only rotatably mounted around a single axis, the beam position can be changed very quickly.

It is advantageous if the beam position system comprises a parallel offset unit for setting the at least one angle of incidence. In addition or alternatively, it is also advantageous if the beam position system comprises a deflection unit for the two-dimensional movement of the laser beam. The parallel offset unit is preferably upstream of the deflection unit in the direction of propagation of the beam. In order to be able to effect a highly rapid adjustment of the laser beam position, it is advantageous if each of the parallel offset unit and/or the deflection unit comprises two mirrors rotatably mounted around a single axis of rotation. With this, a position parameter can preferably be adjusted by means of each of the mirrors. Preferably, setting parameters and position parameters are joined together in the processing area by means of a coordinate transformation, which is defined in a factory calibration process. By means of the parallel offset unit, the laser beam can be displaced on a displacement axis, which is aligned perpendicular to the optical axis of the focusing optics. Due to such parallel displacement, the angle of incidence of the laser beam on the processing surface can be changed.

Furthermore, it is advantageous if the scanner head features a focus setting unit, which in particular is upstream of the beam position sensor. By means of such focus setting unit, the focus position of the laser beam can be changed in a z-direction. For this purpose, the focus setting unit preferably comprises a beam-expanding telescope unit with at least one lens that is displaceable along the optical axis.

Alternatively, it is equally advantageous if the focusing optics for changing the focal position of the laser beam in the z-direction can be axially displaced along its optical axis. The focus setting unit is also preferably connected to the control unit, such that it can be controlled accordingly.

An adjustment device for the offline adjustment of a scanner head is also proposed. The adjustment device comprises a scanner head for laser material processing. The scanner head comprises focusing optics, by means of which, in a processing location, a laser beam can be focused on a processing surface of a workpiece. Furthermore, the scanner head features a beam position system for influencing the laser beam position. The beam position system is upstream of the focusing optics in the direction of propagation of the laser beam. Furthermore, the beam position system comprises at least two controllable and/or movable optical elements. Furthermore, the beam position system comprises at least two movable optical elements that can be controlled, in particular by means of a control unit. By means of the beam position system, an angle of incidence of the laser beam on the processing surface can be set through a parallel displacement of the laser beam perpendicular to the optical axis of the focusing optics. In addition or alternatively, by means of the beam position system, the processing location of the laser beam can be moved in a two-dimensional manner on the processing surface. In addition to the scanner head, the adjustment device further comprises a computing unit. The computing unit is formed in particular as an external computing unit and/or is connected through an external interface of the scanner head to a beam position sensor and/or a control unit of the scanner head. The scanner head is formed according to the preceding description, whereas the specified characteristics may be present individually or in any combination. With the adjustment device, a highly rapid and high-quality offline adjustment of the scanner head may take place. Advantageously, this does not have to influence any external unit upstream of the scanner head, such as the laser beam source, in the direction of the beam path. Instead, all data are determined in the scanner head and are set and/or adjusted by means of it, in particular by means of the beam position system. Thus, the scanner head or the adjustment device is a self-supporting system that can be mounted and adjusted independently of the framework conditions on the customer's side.

An adjustment process for the offline adjustment of a scanner head and/or an adjustment device is also proposed. The scanner head and/or the adjustment device are formed according to the preceding description, whereas the specified characteristics may be present individually or in any combination. Upon the adjustment process, the actual position of the laser beam is detected offline; that is, prior to the actual machining process. This actual position of the laser beam is detected or determined by means of a beam position sensor, which can detect at least four independent position parameters of the laser beam. The data detection and/or the detection of the actual position of the laser beam is further carried out in relation to the direction of propagation of the laser beam in an area that is downstream of a beam position system of the scanner head. Advantageously, in addition to externally induced changes to the laser beam position, changes to the laser beam position caused by the beam position system can thus also be sensed by the beam position sensor. After detecting the actual position of the laser beam by means of the beam position sensor, a computing unit compensates the detected actual position of the laser beam with a target position that is stored, in particular in a memory unit. In particular, if the actual position deviates from the stored target position, the computing unit calculates a correction value for the beam position system. Subsequently, a control unit adjusts the beam position system, taking into account the correction value. The adjustment process described above can be carried out once or several times, whereas the adjustment process in the latter case would represent a control loop.

It is advantageous if the target position of the laser beam is determined at the factory, in particular within the framework of a factory calibration process. Furthermore, it is advantageous if such target position of the laser beam, which is determined individually for each manufactured scanner head, is stored in a memory unit.

In particular, the beam position can be determined and stored as the target position of the laser beam, for which the factory calibration process of the scanner head was carried out. Thus, upon start-up, the beam position, for which the calibration parameters were determined, can be restored. This is advantageous, since the same beam position at the input of the scanner head need not present upon calibration at the factory and upon start-up on the customer's side. In addition, no specific (absolute, centered, straight . . . ) beam position is required either in the calibration device at the factory or in the customer system in order to achieve a highly well-adjusted and calibrated state after start-up.

With the factory calibration process, for example, parameters of the coordinate transformations can be determined, with which, during the operation of the scanner head (online) from given coordinates for the beam position and focus position in the machining field, the corresponding control values for the movable optical elements of the beam position system and the control value for the focus adjustment system is calculated.

The correction value determined in the adjustment process may be an offset value, which is added to the control values after the coordinate transformation. In particular, the correction value may correspond to four angle correction values, which are added to the four angle control values of four rotatable optical elements of the beam position system.

In addition to the measurement of the beam position in accordance with the invention with the beam position sensor and the correction of the beam position through the degrees of setting freedom of the beam position system, the scanner head can also be formed in such a manner that, by means of it, the measurement of the spatial beam profile and/or the divergence of the beam can take place through one or more other suitable sensor units or a correspondingly formed beam position sensor, which, based on suitable technical design, can determine, preferably in addition to the beam position, additional measured values regarding the condition of the laser beam. Such measured values may also include intensity, polarization state or spectral properties of the laser. Such additional measurement data relating to the beam characteristics may optionally be additionally used in conjunction with the adjustment process described above. Thus, in addition to the determined correction value for the beam position, it is also possible to use additional information for the correction of deviations other than the beam position in the computing unit for the calculation of the setting parameters of the moving elements of the scanner head.

For example, a deviation of the divergence of the beam from a target divergence in the computing unit as determined by a suitable measurement can be compensated within the framework of the calculation of the setting parameters of the focus setting unit and of the beam position unit. Thus, it can be ensured that the focus is guided on the desired machining path even if the beam divergence differs, while at the same time the predetermined angle of attack of the beam is maintained. In this exemplary case, the correction value of the beam position according to the invention in the computing unit can also be included in a further correction process and offset together or with other correction values (for example), and transmitted to the control unit.

BRIEF DESCRIPTION OF THE DRAWINGS

Further advantages of the invention are described in the following embodiments. The following is shown.

DETAILED DESCRIPTION

Figure 1:
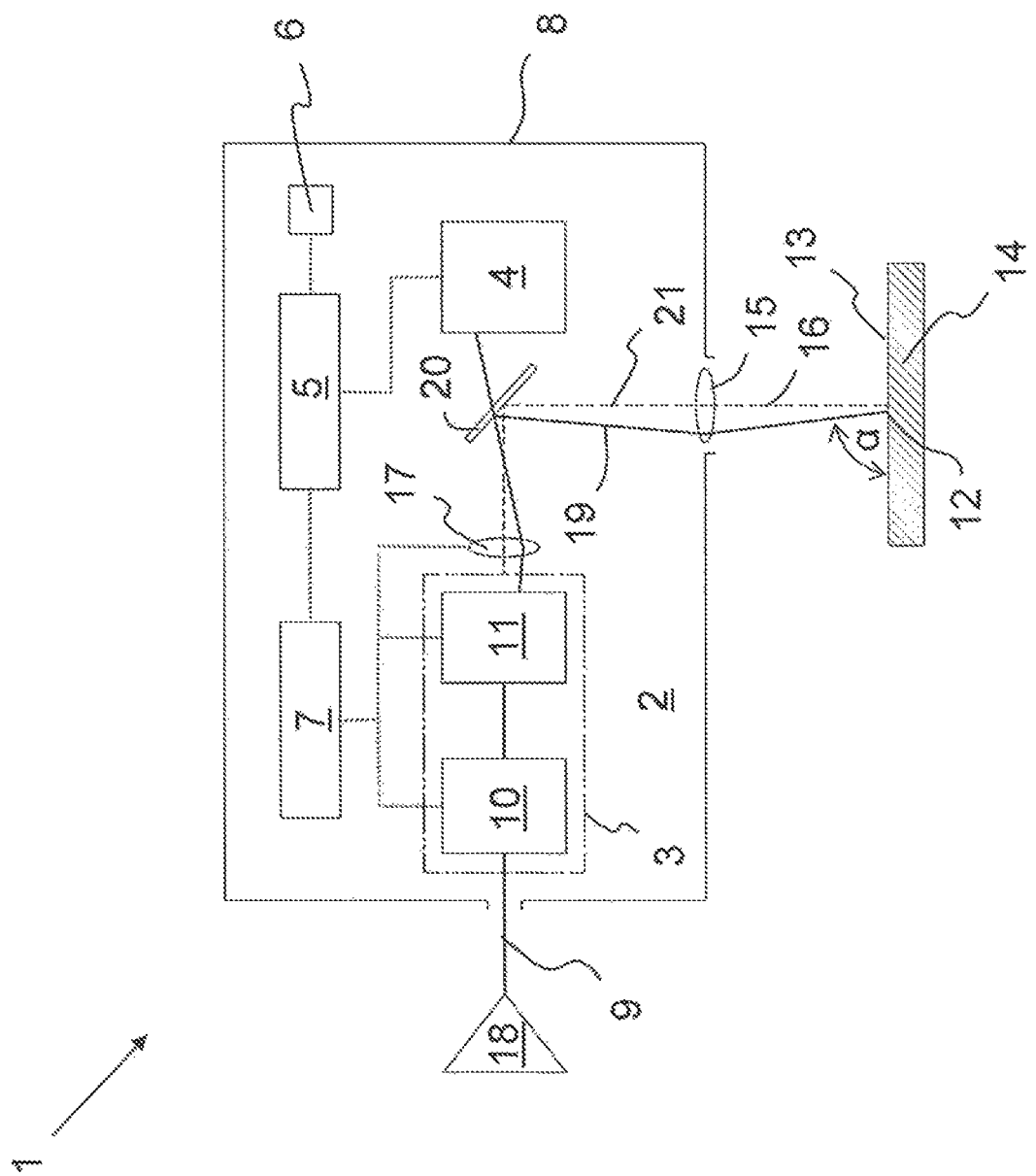
FIG. 1 is a schematic representation of an adjustment device according to a first embodiment, with which all components of the adjustment device are integrated into a scanner head.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows an adjustment device 1 in a schematic representation, with which a beam position system 3 of a scanner head 2 can be adjusted for laser material processing. The adjustment device 1 comprises, in addition to the beam position system 3, a beam position sensor 4, a computing unit 5, a memory unit 6 and/or a control unit 7. According to the embodiment illustrated in FIG. 1, the adjustment device 1 is completely integrated into the scanner head 2. Thus, it is located inside a scanner housing 8.

The position of the laser beam 9 can be influenced by means of the beam position system 3. For this purpose, the beam position system 3 comprises at least two optical elements, which are not shown in detail in the figures, that are controllable by the control unit 7. Such optical elements preferably comprise rotatably mounted mirrors, which can be controlled by means of an actuator.

According to the present embodiment, the beam position system 3 comprises a deflection unit 11. The deflection unit 11 is formed in such a manner that, by means of it, a processing location 12 in which the laser beam 9 impinges on a processing surface 13 of a workpiece 14 can be moved on the processing surface 13 in a two-dimensional manner; that is, in the x- and y-direction. For this purpose, the deflection unit 11 preferably comprises two mirrors, each of which is mounted rotatably only around a single axis of rotation. In this manner, the method of the processing location 12 can be generated on the processing surface 13 in the x-direction over the first mirror and in the y-direction over the second mirror.

Furthermore, the beam position system 3 comprises a parallel offset unit 10. In the direction of propagation of the laser beam 9, the parallel offset unit 10 is preferably upstream of the deflection unit 11. By means of the parallel offset unit 10, an angle of incidence of the laser beam 9 on the processing surface 13 can be adjusted. This is effected through a parallel displacement of the laser beam 9 perpendicular to an optical axis 16 of focusing optics 15. Accordingly, the focusing optics 15 is downstream of the beam position system 3, in particular the parallel offset unit 10, in the direction of propagation of the laser beam 9. By means of the focusing optics 15, the laser beam 9 can be focused in the processing location 12 on the processing surface 13 of the workpiece 14.

In order to form this parallel displacement of the laser beam 9, the parallel offset unit 10 comprises at least two rotatable mirrors. By means of each of such mirrors, an angle of inclination a of the laser beam 9 can be set. Accordingly, for example by means of a first movable mirror in a x-z plane, a first inclination angle can be adjusted, and by means of the second movable mirror in a y-z plane, a second inclination angle can be adjusted. Alternatively, however, the parallel displacement of the laser beam 9 can also take place by means of two successive movable, in particular rotatable or tiltable, optical disks.

The scanner head 2 for laser material processing shown in FIG. 1 further comprises a focus setting unit 17. By means of this, the laser beam 9 can be changed in a z-direction. For this purpose, for example, a lens of the focus setting unit 17 is axially displaceable in the direction of propagation of the laser beam. According to the present embodiment, the focus setting unit 17 is arranged between the beam positioning system 3 and the focusing optics 15. However, in an alternative embodiment not shown here, the focus setting unit 17 could also be formed by the focusing optics 15. In this case, the focusing optics 15 for changing the focal position of the laser beam 9 in the z-direction relative to its optical axis 16 would be axially displaceable.

As already mentioned above, the scanner head 2 features a control unit 7. According to the present embodiment, this is integrated into the scanner head 2. According to FIG. 1, the control unit 7 is connected to the beam position system 3, specifically in particular to the parallel offset unit 10 and the deflection unit 11. The control unit 7 can be used to control the movable optical elements, in particular mirrors, not shown in detail in the figures. As a result, by means of the parallel offset unit 10, the angle of incidence, and by means of the deflection unit 11, the position of the processing location 12 can be adjusted in the x-y plane. In addition, the control unit 7 is electrically connected to the focus setting unit 17, such that, by means of it, the focus position is adjustable in the z-direction.

One problem with the start-up on the customer's side of the scanner head 2 is that the laser beam 9 generated by a laser source 18 enters the scanner head 2 in a misaligned manner. Thus, even with a beam positioning system 3 properly calibrated at the factory, such adjustment error continues in direction of propagation of the beam across all components of the scanner head 2; that is, across the parallel offset unit 10 and the deflection unit 11. In order to correct this adjustment error coupled in front of the beam position system 3, according to the embodiment shown in FIG. 1, the scanner head 2 comprises at least parts of the adjustment device 1, whereas, according to the first embodiment, the adjustment device is completely integrated into the scanner head 2.

Herein, the beam position sensor 4 forms a component of the adjustment device. With the beam position sensor 4, an actual position 19 of the laser beam 9 in the area of the beam path between the beam position system 3 and the focusing optics 15 can be detected. For this purpose, the beam position sensor 4 is downstream of the beam position system 3 in the direction of propagation of the laser beam 9. Furthermore, the beam position sensor 4 is upstream of the focusing optics 15 is upstream in the direction of propagation of the laser beam 9. Accordingly, the beam position sensor 4 is integrated into the scanner head 2 in such a manner it can detect the actual position 19 of the laser beam 9 in the area of the beam path between the beam position system 3 and the focusing optics 15.

For this purpose, a beam splitter 20 is arranged between the beam position system 3 and the focusing optics 15. Preferably, the beam splitter 20 is formed as a semi-transparent mirror. By means of the beam splitter 20, the laser beam 9 can be, without its actual position 19 being changed, coupled out of the beam path leading to the focusing optics 15. The decoupled part of the laser beam 9 can now be detected by means of the beam position sensor 4. According to FIG. 1, the beam position sensor 4 and the beam splitter 20 are arranged relative to one another in such a manner that the laser light transmitted by the beam splitter is guided onto the beam position sensor 4 and the laser light reflected by the beam splitter 20 is guided onto the focusing optics 15.

The actual position 19 of the laser beam 9 is determined by at least four independent position parameters of the laser beam 9. By detecting such at least four independent position parameters, the beam position sensor 4 thus indirectly senses the actual position 19 of the laser beam 9 in the area between the beam position system 3 and the focusing optics 15. The position parameters for determining the actual position 19 of the laser beam 9 may comprise translational and/or rotational position parameters.

According to FIG. 1, the beam position sensor 4 is connected to the computing unit 5 presently integrated into the scanner head 2. By means of such linkage, the position parameters or the actual position 19 of the laser beam 9 determined by it can be transmitted to the computing unit 5.

The adjustment device 1 further comprises the memory unit 6, in which a target position 21 of the laser beam 9 is stored. The target position 21 comprises that position of the laser beam 9, which is to feature this in the area between the beam position system 3 and the focusing optics 15. In an adjustment process, this target position 21 is now set and/or adjusted. For this purpose, the target position 21 of the laser beam 9 or the at least four position parameters determining the target position 21 were determined at the factory prior to delivery of the scanner head 2. Thus, with such factory calibration process, manufacturing tolerances of the beam position system 3 and/or the focus setting unit 17 can be considered. The target position 21 of the laser beam 9 determined at the factory is stored in the memory unit 6. The memory unit 6 may be a separate unit, or may be integrated into the computing unit 5.

The computing unit 5 compares the actual position 19 detected by means of the beam position sensor 4 with the target position 21 of the laser beam 9 determined at the factory and/or stored in the memory unit 6. If an adjustment error upstream of the beam position system 3 is present, the computing unit 5 may determine a deviation of the actual position 19 from the desired target position 21. In this case, the computing unit 5 calculates a correction value. Such correction value determines a readjustment of the beam position system 3, in particular the parallel offset unit 10 and/or the deflection unit 11, to be undertaken. The computing unit 5 uses an iterative approximation process and/or a stochastic search process to calculate the correction value. The computing unit 5 is connected to the control unit 7. Thereby, the correction value determined by the computing unit 5 can be transmitted to the control unit 7. By means of the correction value, a readjustment of the beam position system 3, in particular of at least one optical element of the parallel offset unit 10 and/or the deflection unit 11, is now carried out by means of the control unit 7.

Advantageously, through the corresponding readjustment of the beam position system 3, the adjustment error upstream of this can thus be corrected, such that the actual position 19 corresponds to the target position 21 after the execution of the adjustment. Optionally, the adjustment process described above may also be formed as a control loop, whereas the actual position 19 of the laser beam 9 readjusted by means of the correction value is again detected through a sensor by means of the beam position sensor 4, and is checked by the computing unit 5 within the framework of an additional actual/target position comparison. This process can be carried out until the actual position 19 is within a predetermined tolerance range.

The above adjustment process does not take place online (that is, not during the machining process), but offline (that is, prior to the commencement of the actual machining process. The offline adjustment is accordingly carried out, for example, upon the installation on the customer's side of the scanner head and/or within predetermined time intervals, in order to be able to correct misalignments that are caused by temperature or wear.

Figure 2:
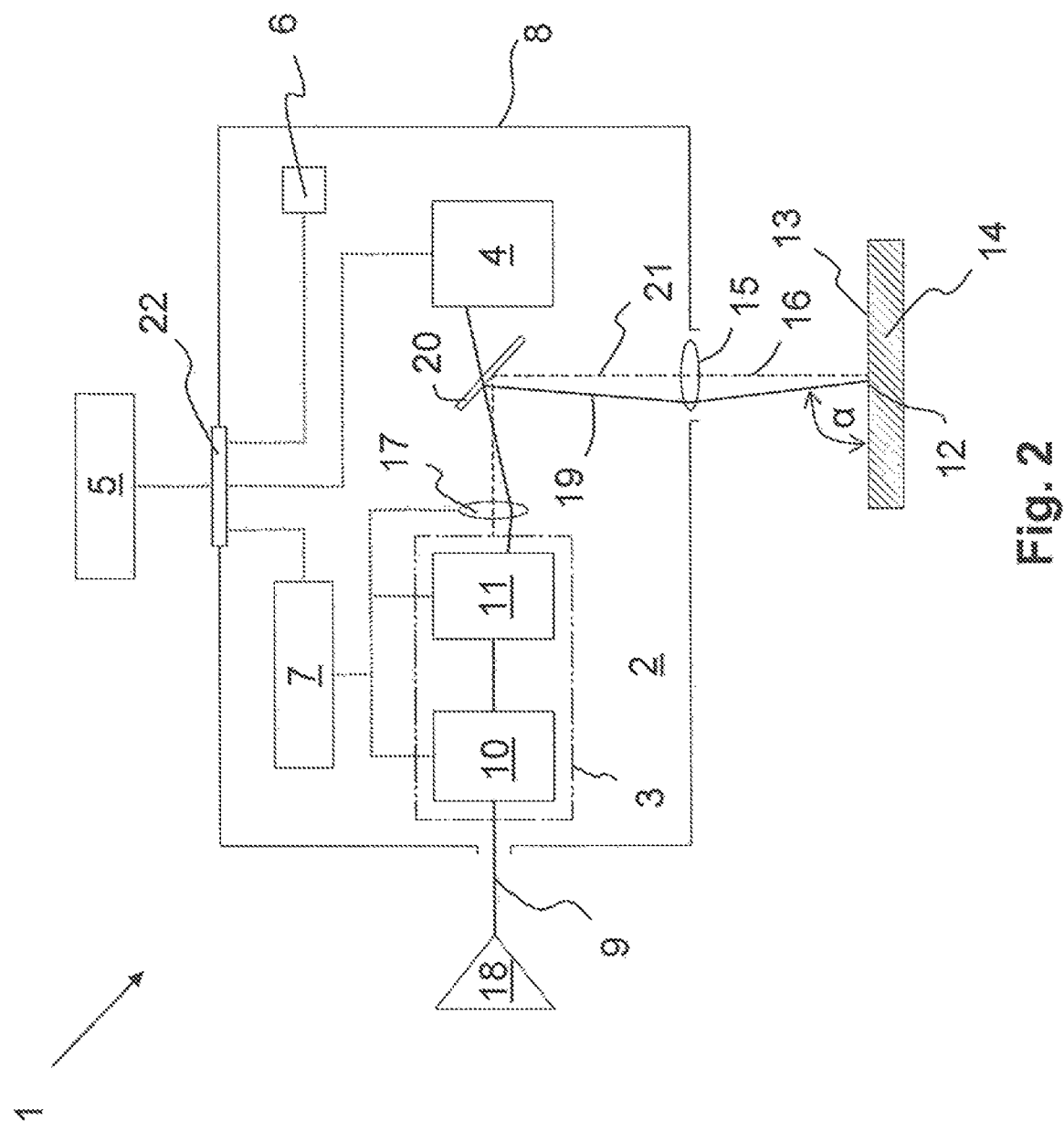
FIG. 2 is a schematic representation of an adjustment device according to a second embodiment, with which a computing unit is connected through an external interface to the components integrated into the scanner head.

FIG. 2 shows the adjusting arrangement 1 according to a second embodiment. Herein, the same reference signs are used for characteristics that are identical and/or at least comparable in their design and/or mode of action in comparison to the first embodiment shown in FIG. 1. Unless they are explained again in detail, their design and/or mode of action corresponds to those of the characteristics already described above.

The adjustment device 1 shown in FIG. 2 comprises, like the embodiment shown in FIG. 1, a beam position sensor 4 for detecting the actual position 19 of the laser beam 9, a computing unit 5 for carrying out an actual/target value comparison and/or for calculating a correction value, a control unit 7 for readjusting the beam position system 3, taking into account the at least one correction value and the beam position system 3 for influencing the laser beam position.

However, in contrast to the first embodiment shown in FIG. 1, the computing unit 5 is formed as an external computing unit. In order to couple this with the scanner head 2, in particular with its beam position sensor 4 and/or control unit 7, the scanner head 2 features an external interface 22. This may comprise a cable-based and/or cable-free interface. The memory unit 6 with its target position of the data determining the laser beam 9 is preferably, as shown in FIG. 2, integrated into the scanner head 2. In this manner, it can be ensured that the target position 21 determined at the factory is assigned individually to the respective scanner head 2 checked at the factory. Alternatively, however, it is also conceivable that the memory unit 6 with the stored target position 21 is integrated into the external computing unit 5.

Figure 3:
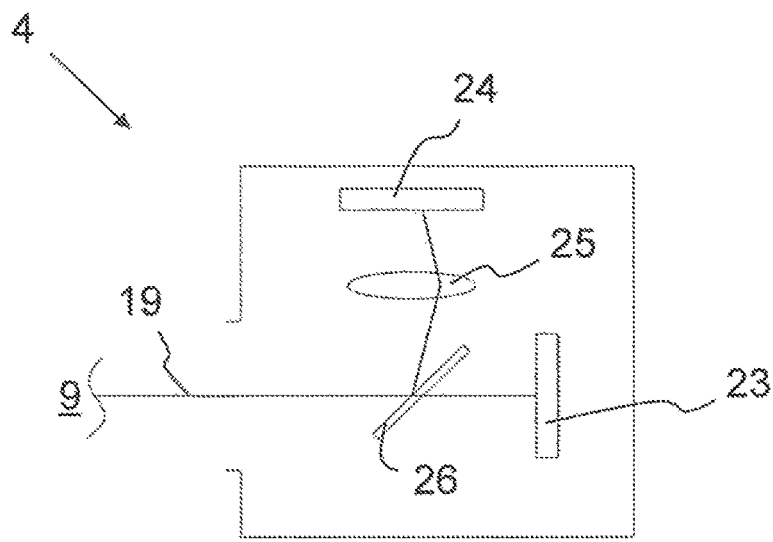
FIG. 3 is a schematic representation of a beam position sensor according to a first embodiment.
Figure 4:
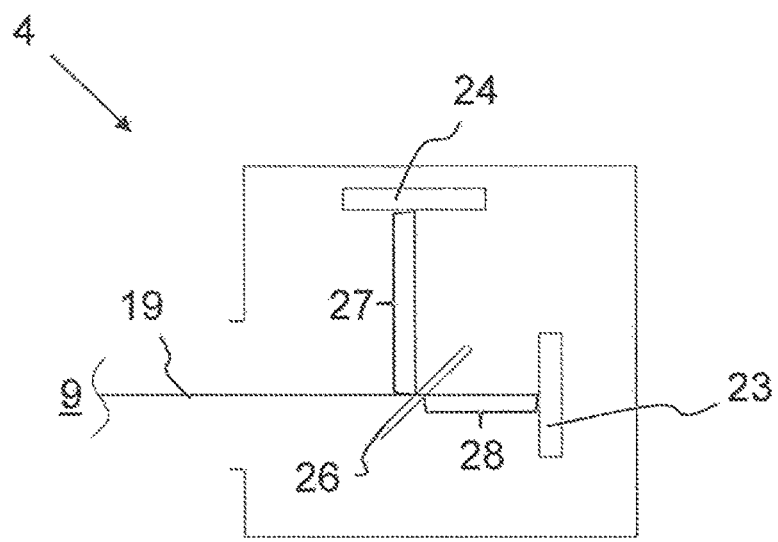
FIG. 4 is a schematic representation of a beam position sensor according to a second embodiment.

FIGS. 3 and 4 show two alternative embodiments of the beam position sensor 4. As already mentioned above, the beam position sensor 4 is formed in such a manner that, by means of it, at least four position parameters of the laser beam 9 can be detected. Thus, the beam position sensor 4 can also be referred to as a 4D sensor. The actual position 19 of the laser beam 9 is determined by means of the at least four position parameters. Thus, the beam position sensor 4 indirectly detects the actual position 19 of the laser beam 9 by means of the four position parameters. The position parameters can be translational and/or rotational position parameters.

With the first embodiment shown in FIG. 3, two translational position parameters are determined by means of a first two-dimensional sensor 23. These may be an x-coordinate and a y-coordinate in relation to a beam position sensor coordinate system. In order to be able to determine the angular position of the laser beam 9 in space, the beam position sensor 4 features a second two-dimensional sensor 24. Two rotational position parameters are determined by means of this. For this purpose, a sensor lens 25 is upstream of the second sensor 24 in the direction of propagation of the laser beam 9. Through this, a defined deflection of the laser beam takes place, by which an angle measurement is possible. In order to be able to conduct the laser beam 9 entering the beam position sensor 4 to both sensors 23, 24, a sensor beam splitter 26 is upstream of it.

Alternatively, according to the embodiment illustrated in FIG. 4, the actual position 19 can be determined by means of two sensors 23, 24 arranged at different distances 27, 28 relative to the sensor beam splitter 26. By means of the first sensor 23, a first x-coordinate and first y-coordinate are detected and, by means of the second sensor 24, a second x-coordinate and second y-coordinate are detected. On the basis of the known distances 27, 28, relative to a reference plane, the x-coordinate, y-coordinate and the angle of incidence of the laser beam can thus be calculated relative to this reference plane.

In both embodiments, the sensors 23, 24 can be, for example, imaging sensors, in particular camera chips. Similarly, position-sensitive multi-surface diodes (quadrant diodes) and/or wavefront sensors are conceivable.

Figure 5:
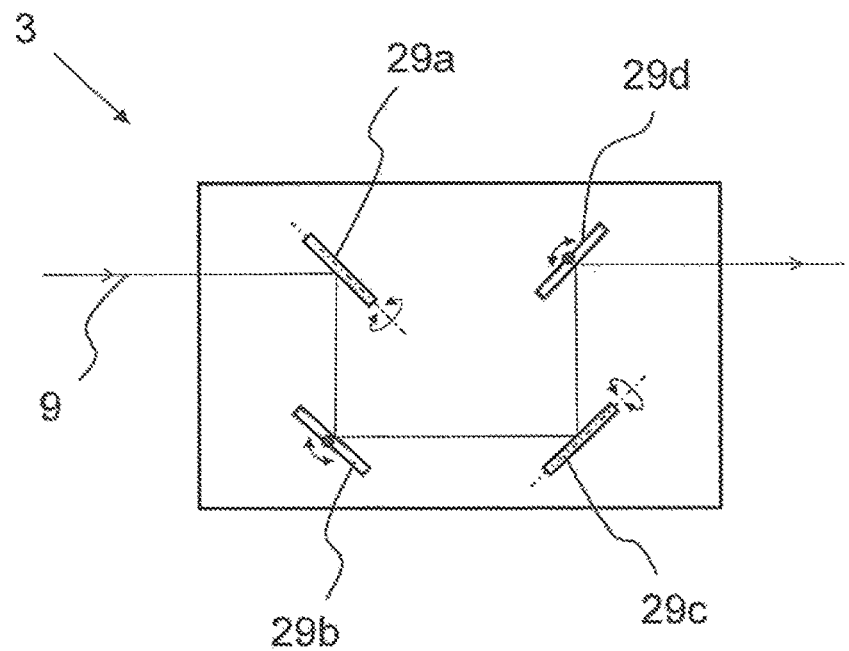
FIG. 5 is a schematic representation of a beam position system according to a first embodiment.

FIG. 5 shows an embodiment of the beam position system 3 with which the beam position can be adjusted by means of four rotatable single-axis mirrors 29a, 29b, 29c, 29d. Each of such single-axis mirrors 29a, 29b, 29c, 29d is rotatable only around a single axis of rotation. Since the axes of rotation are not all parallel to one another and the mirrors are arranged at different locations, the four degrees of setting freedom of the axes of rotation provide four degrees of setting freedom for the beam position. Such embodiment of the beam positioning system 3 is also an example of a beam positioning system 3 that is not built from two separate subsystems (that is, it is built from a separate parallel offset unit 10 and a separate deflection unit 11); rather, the functions of the parallel displacement and the tilt of the beam are integrated into a single system.

Figure 6:
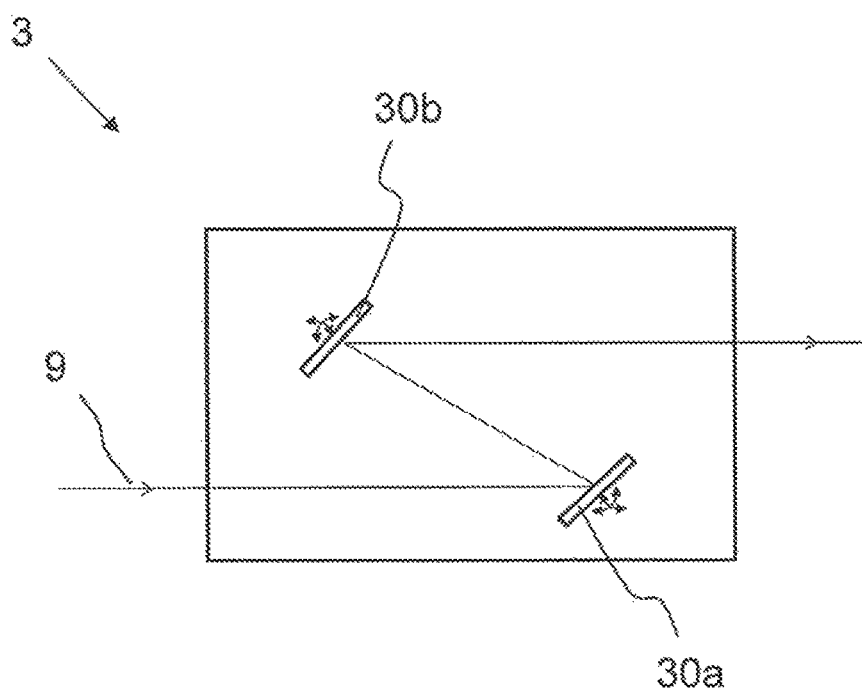
FIG. 6 is a schematic representation of a beam position system according to a second embodiment.

FIG. 6 shows a second embodiment of the beam position system 3, with which the beam position can be adjusted by means of two double-axis mirrors 30a, 30b, which can be tilted around two axes of rotation. Four degrees of setting freedom for the beam position are provided by the two times two degrees of freedom of mirror tilting. Such embodiment of the beam position system 3 is an additional example of a beam position system that is not built from two subsystems, but provides the functions of the parallel displacement and the tilt of the beam in a manner integrated into a single mirror unit.

With the preceding embodiments, the propulsion of the mirror by means of galvanometer drives is particularly advantageous in order to allow a highly dynamic and at the same time highly accurate adjustment of the beam position. The galvanometer drives in the beam position system 3 are operated in online operation, preferably in a closed loop position control, which is carried out independently of the beam position sensor 4. Accordingly, it is based on a position measurement independent of the beam position sensor 4 in the galvanometer drives.

This invention is not limited to the illustrated and described embodiments. Variations within the scope of the claims, just as the combination of characteristics, are possible, even if they are illustrated and described in different embodiments.

LIST OF REFERENCE SIGNS

1 Adjustment device
2 Scanner head
3 Beam position system
4 Beam position sensor
5 Computing unit
6 Memory unit
7 Control unit
8 Scanner housing
9 Laser beam
10 Parallel offset unit
11 Deflection unit
12 Processing location
13 Processing surface
14 Workpiece
15 Focusing optics
16 Optical axis
17 Focus setting unit
18 Laser source
19 Actual position
20 Beam splitter
21 Target position
22 External interface
23 First sensor
24 Second sensor
25 Sensor lens
26 Sensor beam splitter
27 First distance
28 Second distance
29 Single-axis mirror
30 Double-axis mirror

The invention claimed is:

1. An adjustment device, comprising:
a scanner head for laser material processing with a laser beam, the scanner head further comprising;
focusing optics;
beam position system that influences a position of the laser beam, the beam position system upstream of the focusing optics in a direction of propagation of the laser beam, and the beam position system comprising at least two controllable movable optical elements;
the beam position system configured to adjust an angle of incidence of the laser beam on a processing surface of a workpiece through a parallel displacement of the laser beam perpendicular to an optical axis of the focusing optics to move a processing location of the laser beam on the processing surface in two dimensions; and
a beam position sensor downstream of the beam position system in the direction of propagation of the laser beam, the beam position sensor configured to detect at least four independent position parameters of the laser beam that define an actual position of the laser beam; and
a computing unit in communication with the beam position sensor and a control unit of the beam position system, the computing unit configured for offline adjustment of the laser beam when the adjustment device is not processing material.

2. The adjustment device according to claim 1, further comprising a beam splitter upstream of the beam position sensor in the direction of propagation of the laser beam.

3. The adjustment device according to claim 2, wherein the beam splitter is arranged in a path of the laser beam between the beam position system and the focusing optics.

4. The adjustment device according to claim 2, wherein the beam position sensor and the beam splitter are arranged relative to one another such that the laser beam incident on the beam splitter is guided onto the beam position sensor, and the laser beam reflected by the beam splitter is guided onto the focusing optics.

5. The adjustment device according to claim 1, wherein the computing unit is integrated in the scanner head or is external and in communication with the beam position sensor and the control unit of the beam position system via an integrated interface for the offline adjustment of the laser beam.

6. The adjustment device according to claim 5, further comprising a memory unit in communication with the computing unit, the memory unit containing a stored target position of the laser beam.

7. The adjustment device according to claim 5, wherein the computing unit is configured to generate a correction for the beam position system based on a comparison with the actual position of the laser beam or the four independent position parameters of the laser beam generated by the beam position sensor.

8. The adjustment device according to claim 5, wherein the computing unit is integrated in the scanner head together with the control unit of the beam position system.

9. The adjustment device according to claim 1, wherein the beam position system comprises at least four rotatable optical elements, wherein at least one of the optical elements is driven by a galvanometer drive.

10. The adjustment device according to claim 1, wherein the beam position system further comprises a parallel offset unit that sets an angle of incidence of the laser beam on the processing surface, and a deflection unit that sets two-dimensional movement of the laser beam on the processing surface.

11. The adjustment device according to claim 1, further comprising a focus setting upstream of the beam position sensor that adjusts a focus position of the laser beam in a z-direction.

12. The adjustment device according to claim 1, wherein the focusing optics are axially displaceable with respect to an optical axis thereof to change a focal position of the laser beam in a z-direction.

13. A process for offline adjustment of a scanner head used in laser material processing with a laser beam, the process using the adjustment device of claim 1 and comprising:
- in relation to a direction of propagation of the laser beam and in an area downstream of the beam position system, detecting at least four independent position parameters of the laser beam with the beam position sensor to define an actual position of the laser beam;
- with the computing unit, computing a correction value by comparing the actual position of the laser beam with a stored target position; and
- using the correction value to readjust the laser beam with the beam position.

14. The adjustment process according to claim 13, wherein the target position of the laser beam is determined by a factory calibration process of the scanner head and is stored in a memory unit.

* * * * *